UNITED STATES PATENT OFFICE.

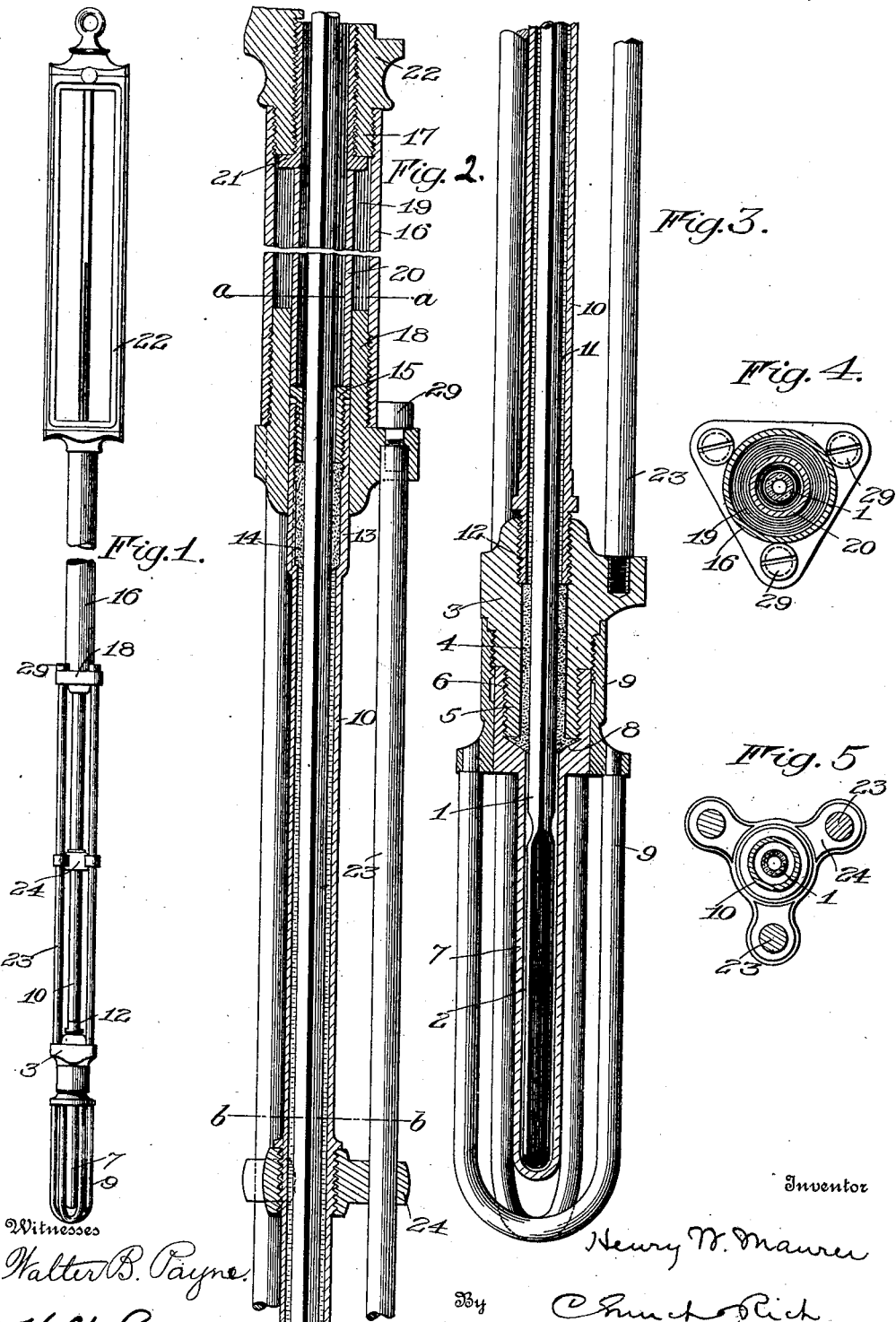

HENRY W. MAURER, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER.

No. 925,120.   Specification of Letters Patent.   Patented June 15, 1909.

Application filed August 7, 1908. Serial No. 447,395.

*To all whom it may concern:*

Be it known that I, HENRY W. MAURER, of Rochester, in the county of Monroe and State of New York, have invented certain new and useful Improvements in Thermometers; and I do hereby declare the following to be a full, clear, and exact description of the same, reference being had to the accompanying drawings, forming a part of this specification, and to the reference numerals marked thereon.

The present invention relates to thermometers of the type which employ a very long stem in order that high temperatures may be indicated and it has for an object to provide a construction by which it is possible to obtain very close readings.

To this and other ends the invention consists in certain improvements and combinations of parts all as will be hereinafter more fully described, the novel features being pointed out in the claims at the end of the specification.

In the drawings: Figure 1 is a front view of a thermometer constructed in accordance with this invention; Figs. 2 and 3 are vertical sections of two adjacent portions of the thermometer; and Figs. 4 and 5 are horizontal sections on lines $a$—$a$ and $b$—$b$ respectively of Fig. 2.

In taking temperatures with long stem thermometers the thermometer is not subjected to the same heat throughout its length, but only the bulb and portions of the stem are affected and the affected portion of the stem is never the same as the thermometer is immersed at different depths. It will be seen therefore that owing to the heating of different amounts of the mercury in the thermometer and the subjection of the other portion of the stem to different temperatures, probably atmospheric temperature at one time and a very low or a very high temperature at others, the instrument is not very accurate, being in fact only an indicator and not an instrument of precision.

Insulation of all portions of the instrument above the bulb will produce more nearly correct readings if the instrument is not permitted to be subjected to the heat for too long a time, or is not used too often, it being well known that no material can perfectly insulate under these conditions. It is clear, however, that such an instrument would be too restricted in its use and that a practicable thermometer must not be limited as to the time of or the depth of immersion. This result is secured in this invention by heating the thermometer substantially throughout its length to the same temperature, the depth of the immersion of the instrument being immaterial.

As a preferred construction for obtaining this result I support the thermometer 1 in proximity to its bulb 2 so that the expansion of the glass of which the thermometer is made will take place mostly above the support. The support in this instance comprises a head 3 formed with a bore to receive the thermometer stem and a surrounding packing 4, and having if desirable a reduced portion 5 at its lower end externally threaded to fit within and engage internal threads on the enlarged upper end 6 of a sheath 7 for the bulb 2, the enlarged bore of the sheath end 6 having an inclined wall 8 at its bottom in order to form an abutment for the packing 4. The head 3 may also have external threads above the threads that secure sheath 7, in order to secure a cage 9 which protects the sheath from accidental blows.

Above the packing head or stuffing box the thermometer is surrounded by exposed heat conducting means which extends about a large portion thereof. In this embodiment this heat conducting means comprises a thin tube 10 containing a heat conducting bath 11 of mercury or other conductor readily affected by heat. The tube is preferably externally threaded at its lower end at 12 to engage within the head 3 and serve as an abutment for packing 4, while its upper end is enlarged at 13 to form a pocket for a packing 14 which engages the thermometer stem in such a manner as to prevent the escape of the liquid bath but to permit the expansion of the stem, a bushing 15 serving to hold the packing within the tube. Above the exposed heat conducting means, the stem is surrounded by an insulator which may comprise a tube 16 connected at its upper end to an externally threaded extension 17 on the indicator head 22 and at its lower end to a head 18 in which the tube 10 fits. The tube 16 may contain any heat insulating material as for instance asbestos 19, and I may also arrange in this tube 16 a tube 20 which also contains asbestos or its equivalent, the last mentioned tube fitting within head 18 against bushing 15 and also abutting a bushing 21 that has screw threaded connection with the walls of a bore at the lower end of the indicator head 22.

To protect the exposed heat conducting means against accidental blows which might cause the breaking of the thermometer I may connect head 18 with head 3 by rods 23 which at their lower ends have screw threaded engagement with head 3 and at its upper ends fit in pockets in the under surface of head 18, being held in the pockets by screw bolts 29 passing through the top of the head. A spacing and bracing member 24 surrounds the tube 10 near its center and has arms perforated to receive the rods 23.

In constructing the thermometer the indications are arranged under the assumption that the thermometer is heated to the same degree throughout its length. This is practically true as will be seen from the following: In use the thermometer is always exposed to the temperature to be ascertained at a point above the support or packing. This effects a heating of the bath about the stem causing that portion of the latter within the bath to be heated to substantially the same degree, and the stem being a good conductor has that portion within the insulator and the head heated to the same degree by conduction. The insulation is provided for the purpose of retaining the heat and not for the purpose of excluding the heat, while the indicator head which is also tightly closed, keeps the upper end of the stem heated.

A thermometer constructed in accordance with this invention is nearly accurate, being correct to within a small per cent. of 1° F., and the length of exposure or the depth of immersion will not affect its accuracy to any material degree.

What I claim is:

1. In a long stem thermometer, the combination with a stem and a bulb, of a support for the stem and the bulb arranged in proximity to the bulb, an exposed heat conducting means surrounding the stem from the support upwardly and having a conductivity permitting it to transmit the external temperature to the stem, and insulation about the stem above the heat conducting means.

2. In a long stem thermometer, the combination with a stem and a bulb, of exposed heat conducting means embodying a heat conducting bath surrounding the stem throughout a large portion thereof and having a conductivity permitting it to transmit the external temperature to the stem and insulation surrounding the stem above the exposed heat conducting means.

3. In a long stem thermometer, the combination with a bulb and a stem, of a support for the stem engaging the latter in proximity to the bulb and an exposed heat conducting means embodying a heat conducting bath for the stem from the support upwardly.

4. In a long stem thermometer, the combination with a bulb and a stem, of a support engaging the stem in proximity to the bulb, an exposed heat conducting means embodying a heat conducting bath surrounding the stem from support upwardly, and insulation surrounding the stem above the bath.

5. In a long stem thermometer, the combination with a bulb and a stem, of a packing head supporting the stem in proximity to the bulb, a tube of high conductivity containing a heat conducting bath surrounding the stem from the head upwardly, and insulation arranged about the stem above the bath containing tube.

6. In a long stem thermometer, the combination with a stem and a bulb, of a head containing a packing engaging the stem in proximity to the bulb, a sheath for the bulb secured to the head, a tube of high conductivity containing a heat conducting bath surrounding the stem above the head and secured to the head, and insulating material surrounding the stem above the tube.

7. In a long stem thermometer, the combination with a stem and a bulb, of a head containing packing engaging the stem in proximity to the bulb, a sheath for the bulb forming one abutment for the packing and having an internally threaded portion engaging the exterior of the head, a tube surrounding the stem above the head and having an externally threaded portion engaging the interior of the head forming the other abutment for the packing, a heat conducting bath in the tube, and insulation surrounding the stem above the tube.

8. In a long stem thermometer, the combination with a stem and a bulb, of a head containing packing engaging the stem, a tube surrounding the stem above the head and containing heat conducting material, a head at the other end of the tube and rods connecting the heads.

9. In a long stem thermometer, the combination with a stem and a bulb, of a head containing packing engaging the stem in proximity to the bulb, a bulb sheath secured to the head, a bath containing tube secured to the head, a head at the other end of the tube, rods connecting the heads, an indicator head and a tube containing insulation connecting the indicator head and the head at the upper end of the bath containing tube.

10. In a long stem thermometer, the combination with a bulb and a stem, of an exposed heat conducting means surrounding the stem above the bulb a distance sufficient to transmit to the entire stem the external temperature, an indicator head inclosing the upper end of the stem and constructed to retain the heat of the latter, and an insulation extending from the head to the exposed heat conducting means.

HENRY W. MAURER.

Witnesses:
RUSSELL B. GRIFFITH,
HAROLD H. SIMMS.